United States Patent [19]
Schuurs et al.

[11] 3,879,262
[45] Apr. 22, 1975

[54] DETECTION AND DETERMINATION OF HAPTENS

[75] Inventors: Antonius Hermanus Wilhelmus Maria Schuurs; Bauke Klaas Van Weemen, both of Oss, Netherlands

[73] Assignee: Akzona Incorporated, Asheville, N.C.

[22] Filed: May 1, 1973

[21] Appl. No.: 356,223

[30] Foreign Application Priority Data
May 11, 1972 Netherlands............... 7206373

[52] U.S. Cl............... 195/63; 195/99; 195/103.5 R; 424/12
[51] Int. Cl.............................................. C07g 7/02
[58] Field of Search............... 195/103.5; 23/230 B; 424/1, 2, 8, 12

[56] References Cited
UNITED STATES PATENTS
3,766,162  6/1973   Spector................... 23/230 B X
3,775,536  11/1973  Spector et al............. 23/230 B X
3,817,837  6/1974   Rubenstein et al......... 195/103.5 R OTHER PUBLICATIONS
Ruberstern, et. al., "Homogeneous" Enzyme Immanoassay. A New Immunochemical Technique, Biochemical and Biophysical Research Communications, Vol. 47, No. 4, 1972, (pp. 846–851).
Warner, et. al., Measurement of the Specificities of Antibodies to Morphine-6—Succinyl—BSA by Competitive Inhibition of Morphine Binding, Chemical Abstr., Vol. 78, 4/1973, (p. 9).
Miles, et. al., Labelled Antibodies and Immunological Assay Systems., Nature, Vol. 219, 1968, (pp. 186–189).

Primary Examiner—David M. Nafe
Attorney, Agent, or Firm—Francis W. Young; Philip M. Pippenger; Hugo E. Weisberger

[57] ABSTRACT

Disclosed herein is an improved method for the detection and determination of haptens by contacting a sample of body fluid with a hapten-enzyme conjugate and a specific binding protein (i.e., antibody) for the hapten. The improvement is characterized in that the nature of the couple in the hapten-protein conjugate used to generate the specific binding protein differs from the couple in the hapten-enzyme conjugate. Also disclosed is a test-pack containing the components required in the test method.

10 Claims, No Drawings

DETECTION AND DETERMINATION OF HAPTENS

The present invention relates to an improved method for the detection and determination of haptens by contacting a fluid sample with a hapten-enzyme conjugate and an antibody against the hapten.

More particularly, the invention relates to an improved hapten determination in that the nature of the couple in the hapten-high molecular substance used to generate the antibody, differs from the nature of the couple in the hapten-enzyme conjugate.

The present invention also relates to a test-pack containing the components required in this test method.

The Netherlands patent application No. 70,16396 and corresponding U.S. patent application Ser. No. 193,702, filed Oct. 29, 1971, now U.S. Pat. No. 3,850,752 describes a method for the detection and determination of, e.g., haptens, consisting in that to a liquid, e.g., a body-fluid, such as blood or urine, containing an unknown amount of hapten, a certain amount of a coupling product of an enzyme and the relative hapten, and a certain amount of antibodies against this hapten in an insoluble form are added. After the addition of these components, a competition reaction takes place between these antibodies and the hapten to be determined, on the one hand, and the antibodies and the hapten coupled to the enzyme, on the other hand. The larger the amount of the free hapten there is in the liquid, the larger the amount of the hapten-enzyme conjugate will be that does not react with the insolubilized antibodies, which conjugate will consequently remain behind in the liquid phase. Now, by measuring the enzyme activity of the hapten-enzyme conjugate in the liquid phase, or of the reacted hapten-enzyme conjugate in the solid phase, the amount of haptens in the test liquid can be determined by a dose response curve for a certain system.

The Netherlands patent application No. 70,18838 and corresponding U.S. patent application Ser. No. 206,952 filed Dec. 10, 1971, now U.S. Pat. No. 3,839,153 describes a corresponding method for the detection and determination of e.g., haptens, differing from the method mentioned above in that the hapten to be determined and the amount of the hapten-enzyme conjugate is not reacted with insolubilized antibodies, but with soluble antibodies, a certain amount of insolubilized antibodies against the first antibodies (anti-antibodies) being added to the liquid after the competition reaction.

The amount of hapten-enzyme conjugate that has reacted with the first antibodies, will then be coupled to the insolubilized second antibodies and, consequently, land in the insoluble fraction, while the part of the hapten-enzyme conjugate that has not reacted, will remain behind in the liquid phase.

In the same way as it is done in the method described above, the amount of hapten in the test liquid can be determined in the liquid or solid phase by a dose response curve, after determination of the enzyme activity.

The relative dose response curve is determined by starting from a certain amount of hapten-enzyme conjugate and bringing this into contact with antiserum (serum containing antibodies) in different dilutions. In each dilution, it is determined how much hapten-enzyme is bound to antibodies. Now, an antiserum dilution is chosen in which, e.g., 80% of hapten-enzyme is bound and to this dilution varying amounts of hapten are added. For each concentration of hapten it is then determined how much hapten-enzyme is bound, e.g., at one unit of hapten, 78% of conjugate and at two units of hapten, 75% of conjugate, etc.

Well then, by adding the above-mentioned amounts of hapten-enzyme and antiserum to an unknown amount of hapten and measuring the enzyme activity of the bound or unbound hapten-enzyme fraction, the amount of hapten in the test liquid can be determined.

From the above, it will be clear that if the affinity of the hapten-enzyme conjugate for the antiserum is high as compared with the affinity between hapten and antibody, relatively large amounts of hapten must be present, if there is to be a question of displacement by the hapten of the conjugate and, consequently, of a measurable enzyme activity in the liquid phase. If, therefore, it would be possible to raise the affinity of the hapten for the antibodies, or the other way around, reduce the affinity of the hapten-enzyme conjugate for the antibodies, the sensitivity of the test system would increase with the consequences that with this test system very small concentrations of hapten could be determined.

Surprisingly, it has now been found that the sensitivity of the above-mentioned determination methods increases considerably if the nature of the coupling between hapten and enzyme differs from that of the coupling between hapten and high molecular substance against which the antisubstances have been formed.

By a coupling of a different nature between hapten-enzyme and hapten-high molecular substance is meant:
a. a chemically different bond or bridge,
b. chemically different haptens which are immunologically related,
c. coupling via another position of the hapten molecule,
d. combinations of (a), (b) and (c).

Haptens are protein-free substances, mostly low molecular ones, which are not capable of stimulating antibody formation, but which do react with antibodies. The latter are formed by coupling the hapten to a high molecular substance, usually a polypeptide or protein, and injecting this coupling product into humans or animals.

As examples of haptens are mentioned: steroids, such as oestrone, oestradiol, oestriol, testosterone, pregnanediol and progesterone; vitamins, such as vitamin B12 and folic acid; thyroxin, tri-iodide thyronine, histamine, serotonine, digoxin, prostaglandin, adrenalin, noradrenalin, morphine, vegetable hormones, such as auxin, kinetin and gibberellic acid, and antibiotics, such as penicillin.

For the preparation of the coupling product hapten-enzyme the substituents that are already present in these components, such as hydroxyl, carboxyl, amino or keto groups can usually be used. If none of these groups is present, it is possible to introduce them as yet, particularly into haptens. Thus, for example, a hydroxyl group can be introduced into steroids, in a microbiological or chemical way, in various positions of the molecule, such as the 6-, 11-, or 16-positions.

By means of a polycarboxylic acid, or a functional derivative thereof, such hydroxy compounds can be coupled to an enzyme. It is also possible to start from a hapten possessing a keto group, or into which such a group has been introduced, after which the coupling to enzyme can take place via a carboxyalkyloxim derivative. If the hapten, in common with the enzyme, possesses amino or carboxyl groups, the two components can be coupled by a method known in the peptide synthesis.

Dependent on the presence of suitable substituents, also other substances such as dialdehydes, for example, glutaric aldehyde, hydrazines, difluorodinitrodiphenylsulfone, diisocyanates, such as toluenediisocyanate and di- or tri-chlorotriazines, can be used for the coupling.

The enzyme to be used for the conjugate described before can in principle be chosen from any class, but preference is given to those enzymes possessing a high specific activity which can be determined in a simple way, for example, colorimetrically, spectrophotometrically, or fluorometrically.

As examples of enzymes which are preferably used, are mentioned: katalases, peroxidases, glucuronidases, glucosidases, galactosidases, urease, and oxidoreductases like glucose oxidase and galactose oxidase.

For the preparation of antibodies against the hapten, the hapten is coupled to a high molecular substance, usually a protein, and injected into an animal, after which the antibody is isolated in the conventional manner.

For the coupling of the hapten to a protein, or possibly another high molecular substance capable of stimulating antibody formation, the same coupling methods can be used as described for the coupling of the hapten to an enzyme.

Essential for the process according to the invention is, however, that the nature of the coupling should differ from that in the hapten-enzyme conjugate. The difference can be of a chemical nature because in the enzyme conjugate the coupling has been effected, for example, via a polycarboxylic acid, while the coupling between hapten and protein has been made via a carboxymethyloxim bridge. It is also possible that in both cases the coupling has been brought about via a polycarboxylic acid, for example, a dicarboxylic acid, when in the one case the dicarboxylic acid contains X C-atoms, for example two, in the case of oxalic acid, and in the other case Y C-atoms, for example four, in the case of succinic acid.

A different nature of the coupling can also be effected if the hapten in the hapten-enzyme conjugate and the hapten in the product hapten-high molecular substance are chemically different but immunologically related. This chemical difference occurs if both haptens differ in the absence or presence of one or more double bonds, e.g. testosterone and dihydro testosterone, and/or one or more substituents like hydroxyl groups, oxo groups, halogen atoms, alkyl groups etc., e.g. oestradiol and 11α-hydroxy-oestradiol, or that one hapten is a functional derivative, e.g. an acylate or ether, of the other hapten, e.g. morphine and codeine.

It has even proved possible to obtain a more sensitive test system by using the same types of bonds in both coupling products, if the bonds have been formed via another position of the hapten molecule, for example, in the case of oestradiol as hapten via the 11-succinyloxy and 17-succinyloxy derivative of 11-hydroxy-oestradiol.

The antibodies produced in this way are employed in the dtermination method according to the invention by reacting them for a given period of time with the amount of haptens to be determined and an amount of the coupling product, and then separating the free coupling product from the coupling product bound to antibodies.

For the separation various methods can be employed, such as precipitation of the coupling product bound to antibodies with an organic solvent or salt, selective absorption of the free coupling product on charcoal covered with a layer of dextran, or precipitation of the coupling product bound to antibodies by means of (second) antibodies against the antibodies of the species of animal in which the antibodies against the hapten have been produced. This latter method is usually called "double antibody" method.

The separation can also be easily effected by insolubilizing the antibodies against the hapten before allowing them to take part in the reaction with hapten and coupling product. The separation then takes place quite easily by centrifugation. This method is often called "solid phase" method. The antibodies can be insolubilized by cross-linking with, e.g., glutaric aldehyde or a chloroformic acid alkyl ester, or by coupling them to an insoluble carrier, such as cellulose, agarose, polystyrene and the like.

Double Antibody and Solid Phase methods can be combined in the so-called DASP method. In this case, a second antibody against the first antibody is prepared by injecting the immunoglobulin fraction of the first antiserum, or of normal serum of the same species of animal, into a different species of animal from that from which the antiserum was first obtained, and then insolubilizing the second antiserum by the methods described above for insolubilizing the first antibody, e.g., coupling the cellulose particles.

For the performance of the process according to the invention, a test-pack is preferably used.

A test-pack for the determination method using an insolubilized antibody chiefly consists of:
1. a certain quantity of the coupling product of a hapten and an enzyme; and
2. a certain quantity of an antibody in an insoluble form.

A test pack for the performance of the determination method according to the invention by means of an insolubilized second antiserum (i.e., DASP method), chiefly consists of:
1. a certain quantity of the coupling product of a hapten and an enzyme;
2. a certain quantity of the first antiserum; and
3. a certain quantity of the insolubilized second antiserum.

In addition to the above reagents, both test kit embodiments of the invention can contain additional components, e.g., reagents for determining the activity of the enzyme used. The invention is illustrated by th following examples.

EXAMPLE I

Determination of Oestrogen

A. Preparation of oestradiol-17-succinyl-HRP and 11α-oestradiol-11-succinyl-HRP

Fifty mg. of oestradiol-17-hemisuccinate or 50 mg. of 11α-OH-oestradiol-11-hemisuccinate were dissolved in 2 ml. of dioxane. The mixture was cooled down to 8°C., after which 0.07 ml. of tri-n-butyl-amine and 0.015 ml. of isobutylchlorocarbonate was added. Thirty minutes after that, 50 mg. of horse radish peroxidase (HRP), dissolved in 7.5 ml. of water/dioxane (3:2) of pH 9, were added. The mixture was reacted for 4 hours, after which it was dialyzed overnight against running tap water and then purified over a Sephadex G-25 column in distilled water. The enzyme-containing fractions were lyophilized. Further purification of the conjugates was obtained by density gradient centrifugation (20–60% sucrose, 16 hours, 238,000 x g).

B. Preparation of oestradiol-17-succinyl-BSA and 11α-oestradiol-11-succinyl-BSA

These conjugates were prepared in the same way as the corresponding HRP derivatives, but the starting materials were 50 mg. of oestradiol-hemisuccinate and 150 mg. BSA (bovine serum albumin). Furthermore, the mixture was precipitated three times with 1.5 parts by volume of acetone of pH 4.5 instead of being purified with Sephadex G-25.

C. Preparation of antibodies against oestradiol-17-succinyl-BSA and 11α-oestradiol-11-succinyl-BSA Rabbits were immunized with the products prepared in B according to the following scheme:

| Time (days) | 0 | 14 | 28 | 42 | 49 |
|---|---|---|---|---|---|
| Quantity (mg.) | 0.25 | 0.25 | 0.25 | 0.25 | bleeding |
| Place | i.m. | i.m. | i.m. | i.v. | |
| Freund's adjuvant | + | + | + | − | | i.m. = intramuscularly
i.v. = intravenously

D. Determination of oestrogen

In a preliminary test, it was determined for each antiserum which part of the enzyme activity of each oestradiol-HRP conjugate (in a suitable concentration determined beforehand) was bound by which antiserum concentration: 0.5 ml. of buffer, 0.1 ml. of oestradiol-HRP and 0.1 ml. of antiserum (in dilutions of from 1:100 to 1:10,000) were incubated at room temperature for 30 minutes. Then, 0.3 ml. of a suspension of DASP anti-rabbit (sheet antibodies against rabbit-γ-globulin, bound covalent to cellulose) was added and the resulting mixture shaken for 2 hours. Then, the mixture was centrifuged and after that 0.5 ml. of the supernatant was mixed with 1.5 ml. of enzyme substrate (80 mg. of 5-amino salicylic acid and 10 μl of a 30% hydrogen peroxide solution in 150 ml. of 0.02 M phosphate buffer of pH 6.0). After 1 hour, the extinction was measured at 450 nm. For the following oestrogen determinations such an antiserum dilution was always chosen that about 40% of the enzyme activity of the oestradiol-HRP was bound to DASP anti-rabbit in the absence of free oestrogen, 0.5 Ml. of a solution of oestrone, oestradiol, or oestriol (concentrations of from 0.1 to 1,000 ng./ml.) was incubated for 30 minutes with 0.1 ml. of antiserum in the fixed dilution, after which 0.1 ml. of oestradiol-HRP in the concentration chosen was added and the mixture was incubated again for 30 minutes. Then, 0.3 ml. of DASP anti-rabbit suspension were added and the determination was further performed as described above. The sensitivity of the resulting determination methods is shown in the following table.

Quantity of oestrogen im ng./ml. required to inhibit half of the oestradiol-HRP from binding to antibody

| Antiserum against | $E_2$-11-BSA | | $E_2$-17-BSA | |
|---|---|---|---|---|
| conjugate | $E_2$-11-HRP | $E_2$-17-HRP | $E_2$-11-HRP | $E_2$-17-HRP |
| oestrone | 1000 | 7 | 3 | 7 |
| oestradiol | 800 | 1.5 | 2 | 7 |
| oestriol | 1000 | 230 | 14 | 380 |

$E_2$ = oestradiol

Similar results were obtained with various antisera. Unless stated otherwise, 0.1 M phosphate of pH 6.0 containing 0.1% lactalbumine was used as a buffer.

EXAMPLE II

Determination of Oestrogen

A. Preparation of oestradiol-17-succinyl-HRP, oestradiol-17-maleinyl-HRP, oestradiol-17-glutaryl-HRP and oestrone-17-N-carboxoymethyloxim-HRP These products were prepared as described in Example I A, the quantities of the oestrogen derivatives being adapted to their molecular weight, and the reaction with oestrone-17-O-(carboxymethyl)oxime being performed in a mixture of dimethylformamide/water instead of a mixture of dioxane/water.

B. Determination of oestrogen

The determination was performed as described in Example I D using two antisera against oestradiol-17-succinyl-BSA (see Examples I B and C). The sensitivity of the determination is given in the following table.

Concentrations of oestrone ($E_1$), oestradiol ($E_2$), and oestriol ($E_3$) in ng./ml. required to inhibit half of the oestradiol-HRP from binding to antibody

| Antiserum | Rabbit A | | | Rabbit B | | |
|---|---|---|---|---|---|---|
| Hapten | $E_1$ | $E_2$ | $E_3$ | $E_1$ | $E_2$ | $E_3$ |
| succinyl | 4 | 6 | 190 | 12 | 9 | 300 |
| maleinyl | 3 | 4 | 160 | 3 | 3 | 100 |
| glutaryl | 4 | 5 | 150 | 8 | 6 | 300 |
| oxime | 2 | 2 | 150 | 1 | 0.8 | 50 |

EXAMPLE III

Determination of Progesterone

A. Determination of 11α-OH-progesterone-11-succinyl alkaline phosphatase (AP) and 12α-OH-progesterone-12-succinyl-AP These substances were prepared analogous to the oestrogen derivatives described in Example I A, but the starting materials were 55 mg. of progesterone-hemisuccinate and 125 mg. of AP.

B. Preparation of 11α-OH-progesterone-11-succinyl-BSA and 12α-OH-progesterone-12-succinyl-BSA These substances were prepared analogous to the oestrogen derivatives described in Example I B.

C. Preparation of antibodies against 11α-OH-progesterone-11-succinyl-BSA and 12α-OH-progesterone-12-succinyl-BSA For the preparation of these antibodies, the scheme of Example I C was followed.

D. Determination of progesterone

The method adopted did not differ essentially from the method described for the determination of oestradiol in Example I D. The enzyme determination took place as follows: 0.5 ml. of an enzyme-containing sample was added to 0.5 ml. of a substrate solution (0.01 M p-nitrophenylphosphate in 0.1 M carbonate buffer of pH 2 being 0.007 M at $MgCl_2$). The mixture was incubated at 37° for 30 minutes, after which the extinction was measured at 400 nm.

It appeared that determination systems in which progesterone-11-AP was combined with antiprogesterone-11-BSA, or progesterone-12-AP with antiprogesterone-12-BSA, were 4 to 10 times sensitive to progesterone than the systems progesterone-11-AP/antiprogesterone-12-BSA and progesterone-12-AP/antiprogesterone-11-BSA.

The reactions described in this example were performed in 0.01 M veronal buffer of pH 7.5, containing 0.1% lactalbumin, unless stated otherwise.

E. Determination of progesterone

Similar results as described in Example III D were obtained with the following test method: 0.5 ml. of a progesterone solution was incubated with 0.1 ml. of antiserum in a suitable dilution, for thirty minutes, after which 0.1 ml. of progesterone-AP in a suitable concentration was added and the mixture was incubated again for thirty minutes. Then, 0.3 ml. of a Norit suspension (25 mg./ml.), incubated beforehand with dextran and then washed, was added, whereupon the mixture was centrifuged for 15 minutes and the AP-activity determined in the supernatant, as described in Example III D.

EXAMPLE IV

Determination of Folic Acid

A. Preparation of folate MBSA 25 mg. of 1-cyclohexyl-3-(2-morpholinoethyl)-carbodiimide and then 20 mg. of folic acid were added to 50 mg. of methylated bovine serum albumin (MBSA) in 5 ml. of 0.05 M phosphate buffer of pH 7.0. The mixture was reacted for 2 hours, after which it was dialyzed against distilled water extensively and then lyophilized.

B. Preparation of antisera against folate-MBSA

In this process, the scheme of Example I C was used.

C. Preparation of folate-glucose oxidase (FGO) and pteroyl-glucose oxidase (PGO)

One mg. of folic acid or 0.7 mg. of pteroic acid was dissolved in 5 ml. of 0.05 M phosphate buffer of pH 7, containing 0.5 mg. of 1-cyclohexyl-3-(2-morpholinoethyl)-carbodiimide. After 5 minutes, 50 mg. of glucose oxidase were dissolved in this mixture, and the reaction was continued for 2 hours. Then the solution was dialyzed against 0.05 M phosphate buffer at pH 7.0 for a considerable time.

D. Determination of folic acid

The determination method was essentially equal to that described in Example I D. The enzyme determination was performed as follows: 0.5 ml. of the enzyme-containing solution was mixed with 2.5 ml. of the substrate solution (50 mg. of glucose, 10 μg of peroxidase and 1 mg. of 5-aminosalicylic acid in 0.05 M phosphate buffer of pH 6.0), and after that the extinction was measured at 450 nm for 30 minutes. The test method in which antibodies against folate-MBSA were combined with FGO proved to be 3 to 20 times less sensitive than that in which the antibodies were combined with PGO. The difference in sensitivity varied for each individual antiserum.

EXAMPLE V

Determination of Oestrogen

A. Preparation of 11α-OH-oestrone-11-succinyl-HRP, 11α-OH-oestrone-11-glutanyl-HRP, 11α-OH-oestradiol-11-succinyl-HRP and 11α-OH-oestradiol-11-glutanyl-HRP These compounds were prepared as described under Example I A. The amounts of oestrogen derivatives used had been adapted according to their molecular weights.

Determination of oestrogen

The determination was performed with the four E-HRP conjugates mentioned above, using the antiserum against 11α-OH-oestradiol-11-succinyl-BSA described under Example I B and I C.

The sensitivities of the determinations are given in the following table:

| | quantity of oestrogen in ng./ml. required to inhibit half of the oestrogen-HRP from binding to antibody | |
|---|---|---|
| E-HRP conjugate | $E_1$ | $E_2$ |
| $E_2$-11-succinyl-HRP | >1000 | >1000 |
| $E_2$-11-glutanyl-HRP | >1000 | 8 |
| $E_1$-11-succinyl-HRP | >1000 | 5 |
| $E_1$-11-glutanyl-HRP | 80 | 0.8 |

EXAMPLE VI

Determination of Oestrogen

A. Preparation of oestradiol-17-succinyl-HRP and oestriol-16,17-di-succinyl-HRP

These compounds were prepared as described in Example I A, taking into account the molecular weights of the oestrogen-derivatives.

B. Preparation of anti(oestradiol-17-succinyl-BSA) and anti(oestriol-16,17-disuccinyl-BSA)

These antisera were prepared as outlined in Example I A and I B.

C. Oestrogen determinations.

The four possible combinations of oestrogen-HRP conjugate and antisera were used for oestrogen determination, as described in Example I D.

The results for two antisera are presented in the following table:

| | quantity of oestrogen in ng./ml. required to inhibit half of the oestrogen-HRP from binding to antibody | | | |
|---|---|---|---|---|
| Antiserum against | $E_2$-17-BSA | | $E_3$-16,17-BSA | |
| conjugate | $E_2$-17-HRP | $E_3$-16,17-HRP | $E_2$-17-HRP | $E_3$-16,17-HRP |
| oestrone | >300 | 6 | 30 | 100 |
| oestradiol | >300 | 16 | 30 | 150 |
| oestriol | >300 | 70 | 100 | 300 |

EXAMPLE VII

Determination of Morphine

A. Preparation of codeine-6-succinyl-HRP

In accordance with the method as described in Example I A codeine-6-hemisuccinate has been converted into codeine-6-succinyl-HRP.

B. Preparation of morphine-3,6-diglutaryl-BSA and preparation of antiserum against this product In accordance with the method as described in Example I B morphine-3,6-dihemiglutarate was converted into morphine-3,6-diglutaryl-BSA and the antiserum against this product was prepared as described under Example I C.

C. Determination of morphine

In accordance with the method as described in Example I D the quantity of morphine was determined in a sample in which the liquid and solid phase were separated using DASP anti-rabbit.

10 ng./ml. Morphine was required for 50% inhibition of the binding of codeine-6-succinyl-HRP to antiserum against morphine-3,6-diglutaryl-BSA.

EXAMPLE VIII

Determination of Testosterone

A. Preparation of 11α-OH-testosterone-11-succinyl-HRP, 11αOH-dihydrotestosterone-11-succinyl-HRP and 11α-OH-nortestosterone-11-succinyl-HRP These compounds were prepared according to the methods used for oestrogens in Example I A.

Preparation of anti(11α-OH-testosterone-11-succinyl-BSA)

This antiserum was prepared as described in Example I B and C for oestrogen antisera.

C. Testosterone determination

Testosterone was assayed with the method described for oestrogens in Example I D.

When using the testosterone-HRP, 30 ng./ml. testosterone was required for 50% inhibition of the binding of the conjugate to antiserum. However, when using the same antiserum and dihydrotestosterone-HRP, 5 ng./ml. testosterone was sufficed for getting the same response. Nortestosterone-HRP was of intermediate sensitivity, requiring 15 ng./ml. of testosterone for 50% inhibition of its binding to the antibodies.

What is claimed is:

1. Process for the detection and determination of a hapten being a protein-free substance which is not capable of stimulating antibody formation but which reacts with antibodies by means of a binding protein capable of reacting to bind said hapten specifically, comprising the steps of:
   a. providing a given quantity of the coupling product of said hapten and an enzyme;
   b. providing a corresponding given quantity of a specific binding protein capable of reacting to bind said hapten and said hapten-enzyme coupling product and being an antibody produced by injecting the coupling product of the hapten and a high molecular substance capable of stimulating antibody formation into the blood of an animal and subsequently isolating the antibody from the animal blood;
   c. the nature of the coupling in the coupling product of the hapten and enzyme and the coupling product of the hapten and high molecular substance being chemically different as a result of either (a) a chemically different bond or bridge, (b) chemically different haptens which are immunologically related, (c) coupling via another position of the hapten molecule, or (d) combinations of (a), (b) and (c);
   d. contacting a sample of a fluid containing the hapten to be determined with said coupling product of the hapten and enzyme and said binding protein to form a reaction mixture;
   e. separating the hapten-enzyme coupling product bound to the binding protein from the unbound hapten-enzyme coupling product; and
   f. determining the enzyme activity of a separated portion, which activity is a measure of the quantity of hapten to be determined.

2. The process of claim 1 in which said separation of protein-bound and unbound hapten-enzyme coupling product is carried out by contacting said fluid sample with an insolubilized binding protein specific to the protein used to bind said hapten and said hapten-enzyme coupling product.

3. The process of claim 1 in which said high molecular weight compound in step (b) is a protein.

4. The process of claim 1 in which said specific binding protein for said hapten and hapten-enzyme coupling product in step (b) is in insolubilized form to automatically effect a separation between protein-bound and unbound hapten-enzyme coupling product as the competition reaction proceeds.

5. The process of claim 1 in which said hapten is an oestrogen.

6. The process of claim 1 in which said hapten is progesterone.

7. The process of claim 1 in which said hapten is folic acid.

8. A test-pack for the detection and determination of a hapten being a protein-free substance which is not capable of stimulating antibody formation but which reacts with antibodies by means of a binding protein capable of reacting to bind said hapten specifically, comprising:
   a. a given quantity of the coupling product of said hapten and an enzyme;
   b. a corresponding given quantity of an insolubilized specific binding protein capable of reacting to bind said hapten and said hapten-enzyme coupling product and being an antibody produced by injecting the coupling product of the hapten and a high molecular substance capable of stimulating antibody formation into the blood of an animal and subsequently isolating the antibody from the animal blood;
   the nature of the coupling in the coupling product of the hapten and enzyme and the coupling product of the hapten and high molecular substance being chemically different as a result of either (a) a chemically different bond or bridge, (b) chemically different haptens which are immunologically related, (c) coupling via another position of the hapten molecule, or (d) combinations of (a), (b) and (c).

9. The test-pack of claim 8, in which also includes as an additional component (c) a given quantity of an insolubilized binding protein specific to the binding protein of component (b).

10. The test-pack of claim 8 which further includes reagents for determining the enzyme activity of the enzyme employed.

* * * * *